United States Patent [19]
Wohlrab

[11] Patent Number: 5,846,574
[45] Date of Patent: Dec. 8, 1998

[54] MOLD-ACTUATING APPARATUS

[75] Inventor: Walter Wohlrab, Weissenburg, Germany

[73] Assignee: Krauss-Maffei Aktiengesellschaft, Munich, Germany

[21] Appl. No.: 919,374

[22] Filed: Aug. 28, 1997

Related U.S. Application Data

[63] Continuation of Ser. No. 556,076, Nov. 13, 1995, abandoned.

[30] Foreign Application Priority Data

Nov. 18, 1994 [DE] Germany .......................... 44 41 186.3

[51] Int. Cl.$^6$ ..................................................... B29C 45/64
[52] U.S. Cl. ...................... 425/149; 425/451.9; 425/595
[58] Field of Search ........................ 100/258 A; 425/589, 425/595, 451.9, 149

[56] References Cited

U.S. PATENT DOCUMENTS

| | | | |
|---|---|---|---|
| 2,580,078 | 12/1951 | Denison | 100/231 |
| 4,131,596 | 12/1978 | Allen | 264/40.5 |
| 5,536,166 | 7/1996 | Schad | 425/589 |

FOREIGN PATENT DOCUMENTS

| | | |
|---|---|---|
| 0 554 068 | 8/1993 | European Pat. Off. . |
| A-1 595 056 | 7/1970 | France . |
| B-11 09 356 | 6/1961 | Germany . |
| A-39 17 361 | 9/1990 | Germany . |
| 92 12 480 | 1/1993 | Germany . |
| A-1 029 641 | 5/1966 | United Kingdom . |
| WO-A-94/ 17977 | 8/1994 | WIPO . |

OTHER PUBLICATIONS

Patent Abstracts of Japan, Vol. 7, No. 68 (M–201), 19 Mar. 1983, A 57–209799, (Nitsusei Jiyushi Kogyo KK).
Patent Abstracts of Japan, vol. 3, No. 284 (M–348), 26 Dec. 1984, 59–152832, (Yamashiro Seiki Seisakusho KK).

*Primary Examiner*—James P. Mackey
*Attorney, Agent, or Firm*—Herbert Dubno; Andrew Wilford

[57] ABSTRACT

An apparatus for closing a mold having a pair of mold halves has a housing, a fixed support block on the housing carrying one of the mold halves, an abutment block on the housing, and a support block movable on the housing between the fixed support block and abutment block in a direction toward and away from the fixed block and carrying the other of the mold halves. A frame has at least one plate lying in a vertical plane generally parallel to the axis and formed with a pair of stiff upwardly extending upper arms, a pair of stiff downwardly extending lower arms below the respective upper arms, and an elastically deformable web extending in the direction between the upper arms and the lower arms. Anchors, e.g. bolts, fix one of the upper arms to the fixed support block and the other of the upper arms to the abutment block. A main actuator effective in the direction is braced between the movable support block and the abutment block and can expand to press the other mold half in the direction against the one mold half with elastic deformation of the web and to spread the upper arms. A secondary actuator braced between the lower arms can be expanded to push the lower arms apart in the direction and thereby urge the upper arms together.

11 Claims, 1 Drawing Sheet

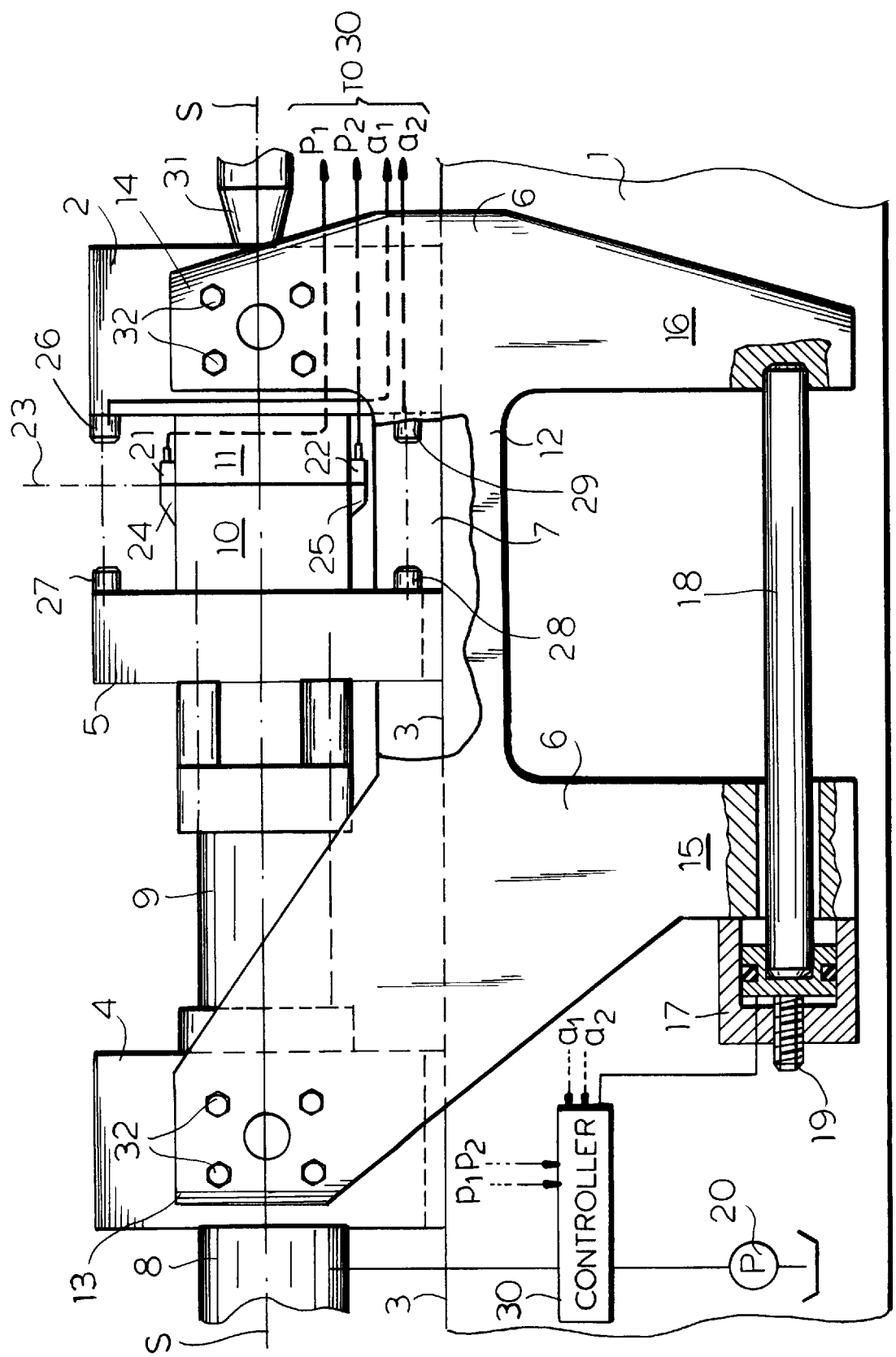

MOLD-ACTUATING APPARATUS

CROSS REFERENCE TO RELATED APPLICATION

This is a file-wrapper continuation of application Ser. No. 08/556,076 filed 13 Nov., 1995, now abandoned.

FIELD OF THE INVENTION

The present invention relates to an injection-molding machine. More particularly this invention concerns a mold-actuating apparatus for such a machine.

BACKGROUND OF THE INVENTION

A typical injection molding system has a housing on which is fixed a support block and an abutment block and between which is movable another support block. One mold half is secured to the fixed support block and the other to the movable support block and a massive actuator, typically a heavy-duty hydraulic cylinder, is effective between the abutment block and the movable support block to push the two mold halves together while plastified resin is injected into and cured in the cavity between the mold halves. The mold halves must be pressed together with sufficient force to prevent the resin, which is injected between them at great pressure, from spreading them and leaking out.

Since the counterpressure created by the pressurized material in the cavity is invariably offset somewhat from the axis defined by the center of the closing actuator, there is always some tendency of the two mold halves to be pushed apart more on one side or the other of the closing axis. In order to compensate for this German utility models 92 12 479, 92 12 480, and 94 02 825 provide a knuckle or pivot joint between each mold half or its support block and the normally C-shaped structure against which it is braced. In this manner some tipping is possible without the mold opening. Furthermore these pivotal mounts increase wear of the various elements of the molding apparatus, especially on the pivots themselves.

OBJECTS OF THE INVENTION

It is therefore an object of the present invention to provide an improved mold-closing apparatus.

Another object is the provision of such an improved mold-closing apparatus which overcomes the above-given disadvantages, that is which reduces wear of the apparatus parts while maintaining the mold halves parallel to each other.

SUMMARY OF THE INVENTION

An apparatus for closing a mold having a pair of mold halves has according to the invention a housing, a fixed support block on the housing carrying one of the mold halves, an abutment block on the housing, and a support block movable on the housing between the fixed support block and abutment block in a direction toward and away from the fixed block and carrying the other of the mold halves. A frame has according to the invention at least one plate lying in a vertical plane generally parallel to the axis and formed with a pair of stiff upwardly extending upper arms, a pair of stiff downwardly extending lower arms below the respective upper arms, and an elastically deformable web extending in the direction between the upper arms and the lower arms. Anchors, e.g. bolts, fix one of the upper arms to the fixed support block and the other of the upper arms to the abutment block. A main actuator effective in the direction is braced between the movable support block and the abutment block and can expand to press the other mold half in the direction against the one mold half with elastic deformation of the web and to spread the upper arms. A secondary actuator braced between the lower arms can be expanded to push the lower arms apart in the direction and thereby urge the upper arms together.

This arrangement therefore eliminates completely the need for the pivotal couplings between the frame and the support blocks or mold halves, replacing them with a simple fixed connection permitting no significant relative movement. Any offcenter forces tending to spread the upper arms of the frame are countered by the secondary actuator to keep them together, stressing the web wholly in tension. What is more, the normally H-shaped frame leaves substantial room open to the side of the molding device so that finished-product unloaders and the like can gain easy access to the mold, unlike prior-art machines where the connecting members blocked the sides of the machine.

According to the invention the secondary actuator is a hydraulic ram, possibly of the membrane type. The main actuator is a hydraulic ram and a controller is connected to both the rams for pressurizing same.

Furthermore in accordance with this invention a pair of such plates transversely flank and are attached to the fixed support and abutment blocks. Each plate has its own secondary actuator.

Upper and lower sensors are according to the invention operatively connected to the mold halves for generating outputs corresponding to the spacing in the direction of respective upper and lower locations of the mold halves. The controller is connected to the sensors and to the actuators for operating the actuators to eliminate any differences in spacing between the upper and lower locations. The sensors can be optical, even laser, sensors. They ensure automatic adjustment for any misalignment. These sensors can be mounted on the mold halves or on the mold support blocks.

For best mechanical advantage the lower arms are longer, measured from the web, than the upper arms. In addition the plate is unitarily formed of one piece with the arms and web. Stops are provided that are effective between the lower arms for establishing a predetermined minimum spacing therebetween.

BRIEF DESCRIPTION OF THE DRAWING

The above and other objects, features, and advantages will become more readily apparent from the following description, reference being made to the accompanying drawing whose sole FIGURE is a largely schematic small-scale side view of the apparatus according to the invention.

SPECIFIC DESCRIPTION

As seen in the drawing a molding apparatus has a housing 1 on which is mounted a fixed support block 2 and which defines a guide surface 3 on which rests an abutment block 4 as well as a movable support block 5. A massive hydraulic ram 8 fixed to the block 4 has a piston rod 9 defining a mold-closing axis S and connected to the block 5 for displacing same axially toward and away from the block 2 in a horizontal closing direction defined by the axis S. The block 2 carries a fixed mold half 11 and the block 5 a movable mold half 10 and an extruder 31 can inject a plastified synthetic resin into a cavity defined between the two mold halves 10 and 11 when they are clamped axially together at a mold-closing plane 23 in the manner well known in the art.

According to the invention a pair of H-shaped and identical frame plates 6 and 7 lying in respective vertical planes parallel to and symmetrically flanking the axis S interconnect the fixed-mold support block 2 and the abutment block 4. The frame 6, which is identical to the frame 7, has a pair of upper arms 13 and 14 secured by respective bolts 32 to the sides of the respective blocks 2 and 4, a pair of downwardly extending lower arms 15 and 16, and a neck web 12 extending between the arms 13 and 14 on one side and the arms 14 and 16 on the other. The arms 13–16 are substantially wider than the web 12. Both upper arms 13 and 14 are solidly bolted to the respective blocks 4 and 2 so that no relative movement is possible between these blocks 4 and 2 and the arms 13 and 14.

A hydraulic cylinder 17 extending parallel to the axis S is fixed to the arm 15 and has a piston rod 18 fixed to the arm 16 of each of the frames 6 and 7. A screw 19 defines an end position for the piston rod 18. A hydraulic controller 30 is connected on one side to a pump 20 and on the other to the two cylinders 8 and 17.

In addition position detectors 21 and 22 are provided on the fixed mold half 11 to one side of the mold-closing plane 23 to coact with stops 24 and 25 on the movable mold half 10 on the other side of the plane 23. Outputs $P_1$ and $P_2$ from these sensors 21 and 22 are fed to the controller 30. In addition or alternatively proximity detectors 26 and 29 mounted on the fixed-mold support block 2 coact with reflectors 27 and 28 on the movable-mold support block 5 and have outputs $a_1$ and $a_2$ also connected to the controller 30.

In use as is standard the rod 9 advances until the two mold halves 10 and 11 are pressed together at the plane 23. To prevent leakage from the mold cavity, considerable axial pressure is exerted. If, for example, the sensor 21 or 26 determines that the mold 10, 11 is open slightly at the top, which results from a deformation of the frame plates 6 and 7 that spreads the upper arms 13 and 14, the controller 30 pressurizes the back compartment of the cylinder 17 to spread the lower arms 15 and 16 and compensate for this misalignment. Contrarily if the sensors 22 and/or 29 detect that the bottom of the mold 10, 11 is slightly open, the pressure in the cylinder 17 is slightly relieved for correction.

I claim:

1. An apparatus for closing a mold having a pair of mold halves, the apparatus comprising:
    a housing forming a straight guide extending parallel to a horizontal axis;
    a fixed support block supported directly on the housing and carrying one of the mold halves;
    an abutment block supported directly on the housing and spaced along the axis from the fixed support block;
    a support block supported directly and movable axially along the straight guide between the fixed support block and abutment block toward and away from the fixed block and carrying the other of the mold halves, the full weight of the blocks and mold halves being directly borne by the housing;
    a pair of separate substantially identical and one-piece H-shaped frame plates lying in respective vertical planes generally parallel to and flanking the axis and each unitarily formed with
        a pair of stiff upwardly extending upper arms,
        a pair of stiff downwardly extending lower arms below the respective upper arms, and
        an elastically deformable web extending in the direction between the respective upper and lower arms;
    anchor means for nonpivotally fixing one of the upper arms of each plate to the fixed support block and the other of the upper arms of each plate to the abutment block and for thereby suspending the H-shaped frame Plates from the fixed support block and abutment block;
    means including a main actuator effective in the direction, braced between the movable support block and the abutment block and expansible for pressing the other mold half in the direction against the one mold half with elastic deformation of the web and spreading in the direction of the upper arms; and
    means including respective secondary actuators braced between the lower arms of each plate and expansible for pushing the respective lower arms apart in the direction and thereby urging the respective upper arms together.

2. The mold-closing apparatus defined in claim 1 wherein the secondary actuators are each a hydraulic ram.

3. The mold-closing apparatus defined in claim 2 wherein the main actuator is a hydraulic ram, the apparatus further comprising
    control means connected to the rams for pressurizing same.

4. The mold-closing apparatus defined in claim 1, further comprising:
    means including upper and lower sensors operatively connected to the mold halves for generating outputs corresponding to the spacing in the direction of respective upper and lower locations of the mold halves; and
    control means connected to the sensors and to the actuators for operating the actuators to eliminate any differences in spacing between the upper and lower locations.

5. The mold-closing apparatus defined in claim 4 wherein the sensors are optical sensors.

6. The mold-closing apparatus defined in claim 5 wherein the sensors are laser sensors.

7. The mold-closing apparatus defined in claim 4 wherein the sensors are mounted on the mold halves.

8. The mold-closing apparatus defined in claim 4 wherein the sensors are mounted on the mold support blocks.

9. The mold-closing apparatus defined in claim 1 wherein the lower arms are longer, measured from the web, than the respective upper arms.

10. The mold-closing apparatus defined in claim 1, further comprising
    respective stop means effective between the lower arms of each plate for establishing a predetermined minimum spacing therebetween.

11. An apparatus for closing a mold having a pair of mold halves, the apparatus comprising:
    a housing forming a straight guide extending parallel to a horizontal axis;
    a fixed support block supported directly on the housing and carrying one of the mold halves;
    an abutment block supported directly on but not fixed to the housing and spaced along the axis from the fixed support block;
    a support block supported directly and movable axially along the straight guide between the fixed support block and abutment block for movement in a direction parallel to the axis toward and away from the fixed block and carrying the other of the mold halves, the full weight of the blocks and mold halves being directly borne by the housing;

a pair of separate and one piece like H-shaped frame plates flanking the blocks, lying in respective parallel vertical planes generally parallel to and flanking the axis, and each formed with
- a pair of stiff upwardly extending upper arms,
- a pair of stiff downwardly extending lower arms below the respective upper arms, and
- an elastically deformable web extending in the direction between the upper arms and the lower arms;

anchor means for nonpivotally fixing one of the upper arms of each plate to the fixed support block and the other of the upper arms of each plate to the abutment block and for thereby suspending the H-shaped frame Plates from the fixed support block and abutment block;

means including a main actuator effective in the direction, braced between the movable support block and the abutment block and expansible for pressing the other mold half in the direction against the one mold half with elastic deformation of the webs and spreading in the direction of the upper arms;

means including respective secondary actuators each braced between the respective pair of lower arms and expansible for pushing the respective lower arms apart in the direction and thereby urging the upper arms together;

means including upper and lower sensors mounted at respective vertically spaced upper and lower locations on the mold halves for generating outputs corresponding to the spacing in the direction of the mold halves at the respective locations; and control means connected to the sensors and to the secondary actuators for expanding same and thereby correcting any inequality between the spacing at the upper and lower locations.

\* \* \* \* \*